United States Patent [19]

Kawai et al.

[11] Patent Number: 4,967,976
[45] Date of Patent: Nov. 6, 1990

[54] TAKE-UP SPINDLE

[75] Inventors: Osamu Kawai, Fujisawa; Shoji Imai, Hiratsuka, both of Japan

[73] Assignee: Nippon Seiko Kabushiki Kaisha, Tokyo, Japan

[21] Appl. No.: 291,158

[22] Filed: Dec. 28, 1988

[30] Foreign Application Priority Data

Dec. 28, 1987 [JP] Japan .................... 62-199227

[51] Int. Cl.$^5$ .......................... B65H 75/48
[52] U.S. Cl. ....................... 242/74; 242/74.1; 242/107
[58] Field of Search ......... 242/74, 74.1, 107, 107.4 R, 242/107.4 A, 107.4 B, 107.4 C, 107.4 D, 107.4 E

[56] References Cited

U.S. PATENT DOCUMENTS 4,119,281 10/1978 Olli Paitula et al. ............ 242/107
4,385,736 5/1983 Yamamoto ................... 242/74 X
4,623,104 11/1986 Mori ........................ 242/107

FOREIGN PATENT DOCUMENTS 69-16656 2/1984 Japan.

Primary Examiner—Stuart S. Levy
Assistant Examiner—Steven M. duBois
Attorney, Agent, or Firm—Wegner & Bretschneider

[57] ABSTRACT

A take-up spindle is used to wind thereon a webbing of a seat belt system. The take-up spindle has a shaft defining a slot through which the webbing may extend, a sleeve fitted externally on the shaft and defining a first slot and a second slot therethrough, and an insert filling out the first slot. Each of the first and second slots of the sleeve permits insertion of the webbing therethrough. The second slot of the sleeve serves to guide the webbing out of the sleeve.

5 Claims, 4 Drawing Sheets

TAKE-UP SPINDLE

BACKGROUND OF THE INVENTION (1) Field of the Invention:

This invention relates to a webbing retractor suitable for use in a seat belt system for protecting an occupant in the event of a vehicular emergency, and specifically to a take-up spindle for such a webbing retractor, which is constructed of a shaft and a sleeve and can effectively prevent a webbing from being pulled out of the retractor even after the take-up spindle has been stopped from rotating in a webbing-releasing direction, in other words, can achieve effective prevention of so-called tightening and release of the webbing wound on the take-up spindle.

(2) Description of the Related Art:

Webbing retractors which have heretofore been known to be useful in a seat belt system for protecting an occupant in the event of a vehicular emergency include those of a type such that a take-up spindle is rotatably supported on a frame to be mounted on a vehicle body, an occupant-restraining webbing is wound up from one end thereof on the take-up spindle, and a mechanism is mounted on an end portion of the take-up spindle so as to prevent the take-up spindle from rotating in a webbing-releasing direction.

The securement structure between a webbing and a take-up spindle in a webbing retractor of the above type will be described in detail. One type of securement structure is shown in FIG. 5 by way of example. A slot 10A in which a turned-over loop portion 14A of an end part of a webbing 14 is received and another slot 10B through which the webbing 14 extends out are formed at antipodal points of a take-up spindle 10. A holding pin 15 extends through the loop portion 14A of the webbing 14. The webbing 14 which has extended out through the slot B is wound on an outer peripheral wall of the take-up spindle 10 and is then guided out into an interior of a vehicle. Another type of securement structure is illustrated in FIG. 6 by way of example. A take-up spindle 10 is constructed of a sleeve 13 and a shaft 11 inserted in a central hole of the sleeve 13. Slots 11A,11B are formed through the shaft 11 at points not antipodal to each other, while slots 13A,13B are formed through the sleeve 13 at points not antipodal to each other. The slots 11A and 13A are angularly in registration, while the slots 11B and 13B are are angularly in coincidence. A turned-over loop portion 14A of an end part of a webbing 14 is received in the slots 13A,11A on one side of the take-up spindle 10. The webbing 14 extends out through the slots 13B,11B on another side of the take-up spindle.

Irrespective of their types, the above-described conventional webbing retractors contains a spacing C in the slots 10A, 11A and 13A of the take-up spindle 10. These slots 10A, 11A and 13A are located on the side that the holding pin 15 is secured. Described more specifically, the spacing C is defined by the turnedover loop portion 14A of the end part of the webbing 14 and the inner side walls or edges of the slots 10A, 11A and 13A.

When a large tensile force is applied to the webbing 14 in a state that the take-up spindle 10 has been locked from rotating in the webbing-releasing direction in the event of an emergency, a webbingtightening force is applied to the take-up spindle 10 so that the take-up spindle 10 may hence be deformed to reduce the spacing C.

When the take-up spindle 10 undergoes such a deformation, its core diameter is reduced to allow the webbing 14 to extend out, whereby the so-called tightening and release phenomenon takes place and locking effects of an associated webbing retractor could be impaired.

SUMMARY OF THE INVENTION

With the foregoing problems of the conventional techniques in view, it is an object of this invention to protect a take-up spindle from deformation even when a large tensile force is applied to a webbing in a state that the take-up spindle has been locked from rotating in a webbing-releasing direction at the time of an emergency, whereby the possibility of occurrence of the so-called tightening and release phenomenon is excluded and locking effects of an associated webbing retractor are improved.

In one aspect of this invention, there is thus provided a take-up spindle for winding thereon a webbing of a seat belt system. The take-up spindle comprises a shaft defining a slot through which the webbing may extend, a sleeve fitted externally on the shaft and defining a first slot and a second slot therethrough, and an insert filling out the first slot. Each of the first and second slots permits insertion of the webbing therethrough. The second slot is adapted to guide the webbing out of the sleeve.

When a large tensile force is applied to the webbing in a state that the take-up spindle has been locked from rotating in the webbing-releasing direction in the event of a vehicular emergency, the take-up spindle begins to undergo deformation in such a manner that the spacing formed in the slot of the take-up spindle on the side of the holding pin and defined by the end part of the webbing and the inner walls or edges of the slot is reduced. The deformation of the take-up spindle is however prevented or reduced owing to the provision of the insert which fills up the spacing. As a result, it is possible to exclude the possibility of the so-called tightening and release phenomenon of the webbing which would otherwise take place by deformation of the take-up spindle, so that locking effects of an associated webbing retractor can be improved.

BRIEF DESCRIPTION OF THE DRAWINGS

The above and other objects, features and advantages of the present invention will become apparent from the following description and appended claims, taken in conjunction with the accompanying drawings, in which:

DETAILED DESCRIPTION OF THE INVENTION AND PREFERRED EMBODIMENTS

Figure 1:
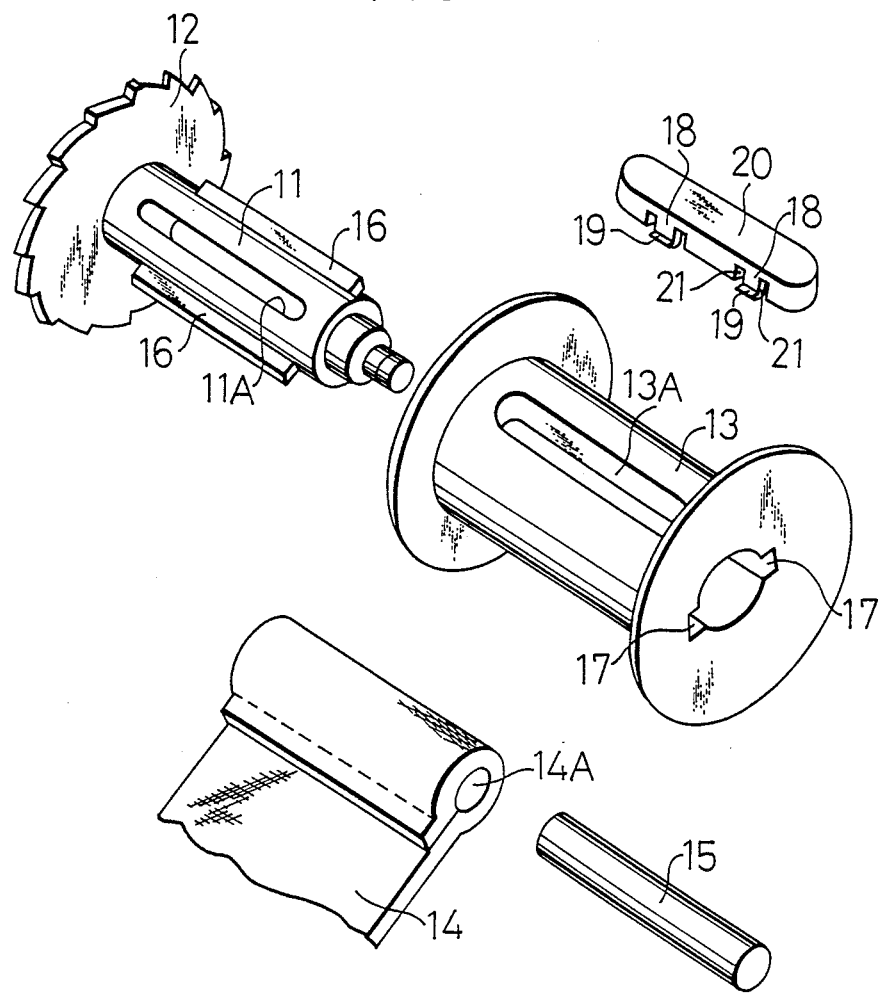
FIG. 1 is an exploded perspective view of a webbing retractor in which a take-up spindle according to a first embodiment embodiment of this invention has been incorporated.
Figure 2:
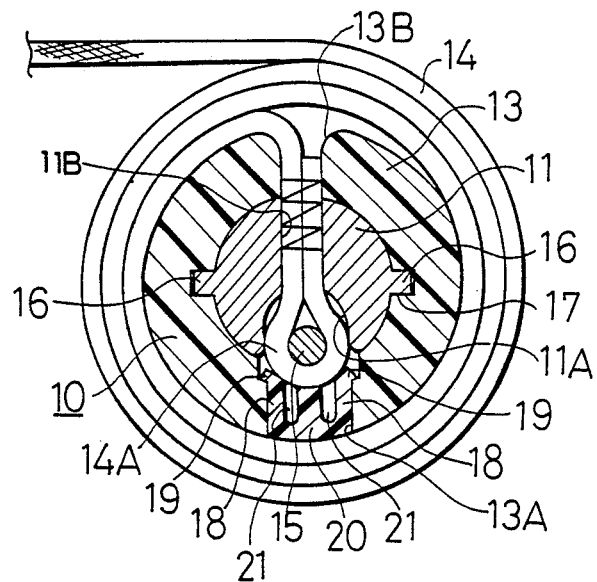
FIG. 2 is a simplified transverse cross-section of the webbing retractor of FIG. 1.

Referring first to FIGS. 1 and 2, a ratchet wheel 12 which constitutes a part of a lock mechanism for the rotation of a shaft in a conventional webbing retractor is mounted either as an integral member or a discrete member on one end of a shaft 11 defining a slot 11A through which a webbing 14 may be inserted. Although not illustrated in the drawings, a spiral spring for rewinding the webbing 14 subsequent to its manual release is provided on the other end of the shaft 11. Plural ridges 16 are axially formed on an outer peripheral wall of the shaft 11. An inner peripheral wall of a sleeve 13, which is fitted on the outer peripheral wall of the shaft 11, has plural grooves 17 which engage the ridges 16 respectively.

A turned-over loop portion 14A is formed at an end part of the webbing 14. Inserted in the loop portion 14A is a holding pin 1 which prevents the webbing 14 from slipping out of the shaft 11 and sleeve 13.

The above members are assembled as shown in FIG. 2. Namely, the turned-over loop portion 14A at the end part of the webbing 14 is held in the slot 11A formed on one side of the shaft 11. On the other hand, an outwardly-extending part of the webbing 14 is guided out through a slot 11B formed on the other side of the shaft 11 and a slot 13B formed through the sleeve 14 fitted on the outer peripheral wall of the shaft 11. The webbing 14 is thereafter wound in one to plural layers (three layers in FIG. 2) around the outer peripheral wall of the sleeve 13 and is allowed to extends further into an interior room of a vehicle.

In the webbing retractor constructed as described above, the sleeve 13 also defines another slot 13A on the side of the holding pin 15, and an insert 20 is provided in the slot 13A in such a way that the insert 20 fills up a spacing formed by the turned-over loop portion 14A at the end part of the webbing 14 and peripheral walls or edges of the slot 13A.

The insert 20 is formed as a whole in the shape of a rectangular parallelepiped, and plural slits 21 are formed in both longitudinal side walls thereof so that engaging lugs 18 are formed as a means for engaging an inner peripheral wall of the sleeve 13. An outer wall of the insert 20 has substantially the same curvature of radius as the outer peripheral wall of the sleeve 13. A hook 19 is formed on an inner edge of each engaging lug 18, which is located on the side of the shaft 11. The hook 19 is in engagement with a corresponding corner portion extending from the corresponding side wall or edge of the slot 13A of the sleeve 13 to the inner peripheral wall of the sleeve 13.

Owing to the above construction, the hook 19 of each engaging lug 18 is brought into engagement with the corresponding corner portion by simply press-fitting the insert 20 inwardly into the slot 13A, so that the insert 20 is held in place to prevent the sleeve 13 from deforming in such a way as reducing the spacing C.

The take-up spindle according to the second embodiment of this invention will next be described with reference to FIG. 3, in which both longitudinal edges or walls of the slot 13A of the sleeve 13 are formed as tapered edges or walls opening at an increasing interval therebetween to an outer peripheral wall of the sleeve 13 and the matching walls of the insert 20 are formed to be commensurate with the tapered edges or walls of the slot 13A of the sleeve 13. Machining of each tapered edge or wall can be facilitated when the tapered edge or wall is formed to lie in an imaginary plane extending out radially from the central axis of the sleeve 13. It should however be borne in mind that the machining of each tapered edge or wall is not necessarily limited to the above manner.

Figure 3:
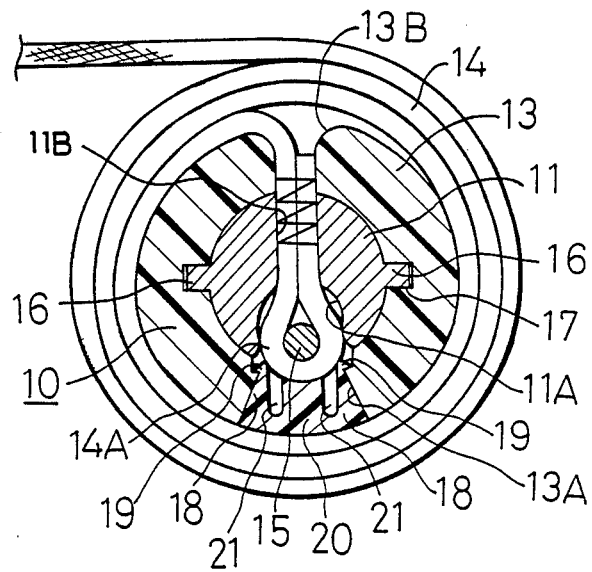
FIG. 3 is a simplified transverse cross-section of a webbing retractor in which a take-up spindle according to a second embodiment of this invention has been incorporated.

According to the second embodiment depicted in FIG. 3, the longitudinal edges or walls of the slot 13A of the sleeve 13 and the matching longitudinal walls of the insert 20 are tapered. When the sleeve 13 begins to undergo deformation to reduce its diameter, the outer peripheral wall of the insert 20 is pushed out radially so that the outer peripheral wall of the insert 20 acts to increase the core diameter of the sleeve 13. As a result, the core diameter of the sleeve 13 is not decreased.

Figure 4:
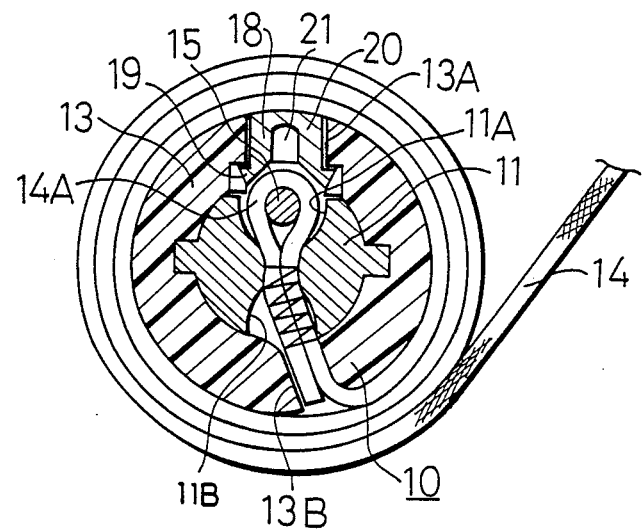
FIG. 4 is a simplified transverse cross-section of a webbing retractor in which a take-up spindle according to a third embodiment of this invention has been incorporated.
Figure 5:
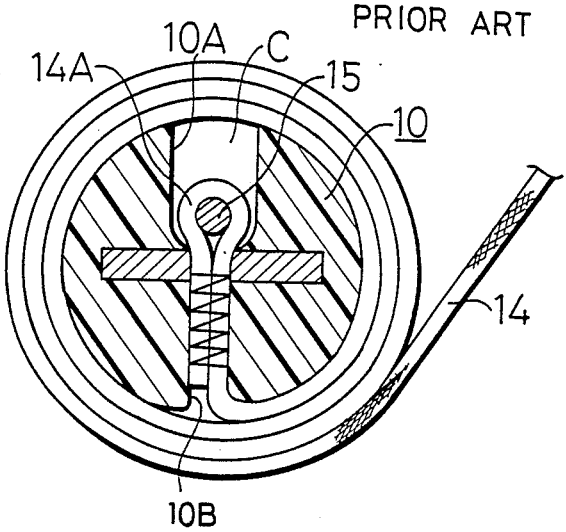
FIG. 5 is a simplified transverse cross-section of a webbing retractor in which a conventional take-up spindle has been incorporated.
Figure 6:
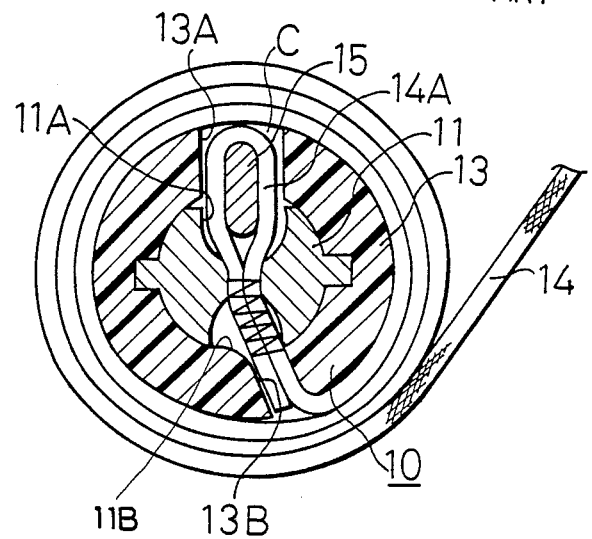
FIG. 6 is a simplified transverse cross-section of a webbing retractor in which another conventional take-up spindle has been incorporated.
Figure 7:
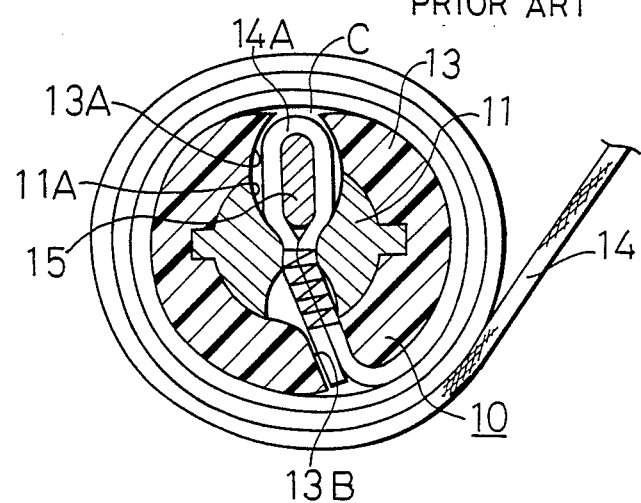
FIG. 7 is similar to FIG. 6 except that a sleeve has been deformed.

The remaining structure of the take-up spindle of the second embodiment is the same as the corresponding structure of the take-up spindle described above with reference to FIGS. 1 and 2, and its description is therefore omitted herein The take-up spindle according to the third embodiment of this invention will next be described with reference to FIG. 4, in which the slot 13B of the sleeve 13 is formed at a point not antipodal to the slot 13A relative to the central axis of the sleeve 13. This arrangement is effective in preventing a tensile force, which has been applied to the webbing 14, from being transmitted locally at a bent portion of the webbing 14 to the sleeve 13, so that a force applied in such a way as opening the sleeve is reduced.

The remaining structure of the take-up spindle of the third embodiment is the same as the corresponding structure of the take-up spindle described above with reference to FIGS. 1 and 2, and its description is therefore omitted herein.

In each of the above embodiments, the engaging lugs of the insert 20 are formed locally in the longitudinal side walls of the insert 20. Needless to say, the longitudinal ends of the insert 20 may be kept open and the entire longitudinal side walls of the insert 20 may be formed as engaging lugs 18. Further, no particular limitation is imposed on the shape, dimensions, etc. of the slits 21 formed in the insert 20. It is only necessary to form the slits 21 in such a way that the engaging lugs 18 have a width sufficient to exhibit a predetermined spring force.

What is claimed is:

1. A take-up spindle for winding thereon a webbing of a seat belt system, comprising:
    a shaft defining a slot through which the webbing may extend;
    a sleeve fitted externally on the shaft and defining a first slot and a second slot therethrough, each of said first and second slots permitting insertion of the webbing therethrough, and said second slot being adapted to guide the webbing out of the sleeve; and
    an insert filling out the first slot, wherein the insert is formed as a whole in the shape of a rectangular parallelpiped, and on a side proximal to the shaft has a means for engaging an inner peripheral wall of the sleeve.

2. The take-up spindle as claimed in claim 1, wherein an outer wall of the insert has substantially the same curvature of radius as an outer peripheral wall of the sleeve.

3. The take-up spindle as claimed in claim 1, wherein both longitudinal edges of the first slot of the sleeve are formed as tapered edges opening at an increasing interval therebetween to an outer peripheral wall of the sleeve and matching walls of the insert are formed to be commensurate with the tapered edges.

4. The take-up spindle as claimed in claim 11, wherein the first and second slots of the sleeve are provided at antipodal points relative to the shaft.

5. The take-up spindle as claimed in claim 11, wherein the second slot of the sleeve is provided at a point offset in a webbing-releasing direction from a point antipodal to the first slot of the sleeve.

* * * * *